3,030,399
CYCLOMATIC CHROMIUM (III) CHELATE HALOGENIDES

John C. Thomas, Lancaster Court, near Wilmington, Del., assignor to E. I. du Pont de Nemours and Company, Wilmington, Del., a corporation of Delaware
No Drawing. Filed July 1, 1953, Ser. No. 365,531
10 Claims. (Cl. 260—438)

This invention relates to a new class of organometallic compounds and more particularly it relates to a new class of organometallic compounds of the elements of group VI-A of the periodic table.

Many organometallic compounds, i.e., compounds wherein the metal atom is bonded directly to one or more organic radicals through carbon thereof, are known, especially those of the alkali metal and alkaline earth metals which have been used as catalysts and/or chemical intermediates in polymerization and synthetic organic chemistry generally. Beecause of their special properties, other organometallic compounds have achieved industrial significance, for instance, tetraethyllead, the universal anti-knock agent for spark ignition engines and certain organometallic compounds of arsenic and mercury, used generally in pharmaceutical and pesticidal outlets. However, despite continuing research very little has been learned about the organometallic derivatives of the transition elements, i.e., the members of the first, second, and third long periods of groups III-A to VII-A and VIII of the periodic table and particularly about the organometallic compounds of such transition elements belonging to group VI, e.g., chromium, which are described as family A of group VI in Sidgwick—"Chemical Elements and Their Compounds" (Oxford 1951), page xxviii, and in Gilman—"Organic Chemistry" (Wiley, 1943), page 564.

Organometallic compounds of group VI-A have received but little attention. Organochromium compounds have been the subject of researches by Hein and coworkers (see, for instance, J. prakt. Chem. 153, 160 (1939), and Naturwissenschaften 28, 93 (1940), and earlier papers therein cited). These authors report the preparation by the Grignard reaction of pentaphenylchromium bromide and, from this compound by suitable reactions, the corresponding hydroxide, the tetraphenylchromium salts and hydroxides, and the non-salt compounds tetraphenyl- and triphenylchromium. All of these compounds contain a plurality of organic radicals, in this instance the phenyl radical, directly linked to the chromium.

Recently Kealy and Pauson, Nature, 168, 1039 (1951), reported the preparation of dicyclopentadienyliron and characterized it as an extremely stable compound. Following this work, several other papers have appeared, for instance, Wilkinson et al., J. Am. Chem. Soc. 74, 6146–6148 (1952), 75, 10–11 (1953), reporting the preparation of similar compounds of other transition elements, e.g., dicyclopentadienylruthenium, dicyclopentadienylcobalt (III) bromide, dicyclopentadienylnickel and the like. In these and other like papers no mention is made of the preparation of any organometallic compound of the elements of group VI-A.

Furthermore, these organometallic compounds contain two cyclopentadienyl radicals directly linked through carbon thereof to the respective metal atom. Since the initial paper of Kealy and Pauson, many investigators have attempted to explain the unusual stability of these compounds and the fact that all previous research workers had failed to prepare similar stable organometallic compounds of the transition elements. The stability of these compounds is thought to be due not only to the particular type of organic radical bonded to the metal but in large part also to the fact that there are two such radicals so linked. Fundamental physical studies, such as ultraviolet, X-ray, infrared, and other investigations capable of defining the molecular geometry of the compound, have all shown that there are two cyclopentadienyl nuclei, in which all carbons are identically bonded, linked to the metal atom and that the structure of the over-all molecule is similar to that of a sandwich wherein the planes of the two cyclopentadienyl rings are essentially parallel with the iron atom equidistant therebetween (see, for instance, Wilkinson et al., J. Am. Chem. Soc. 74, 2125 (1952), Woodward et al., ibid., 3458, Eiland et al., ibid., 4871, Fischer et al., Z.f. Naturf. 7b, 377 (1952), and Dunitz et al., Nature 171, 121 (1953)). These various authors conclude furthermore that the peculiar aromatic nature of the cyclopentadiene rings rather than the expected polyolefinic behavior is similarly due to this peculiar molecular sandwich structure.

This invention has as an object new organometallic compounds of group VI-A elements having but one organic radical directly linked, through carbon thereof, to the metal atom. Another object is the provision of a process for the preparation of these new compounds. A further object is the provision of new compounds of catalytic activity in oxidation and carbonylation reactions. Still another object is the provision of new intermediates for the preparation of group VI-A organometallic compounds. Other objects will appear hereinafter.

These objects are accomplished by the invention of new organometallic compounds wherein a group VI-A metal, e.g., chromium, forms, with a chelating agent, a chelate ring and is additionally singly bonded to an acid anion and to carbon of an organic radical. The compounds are conveniently represented by the following structural formula:

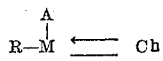

in which A represents an acid anion, Ch the units which together with the central metal atom M of group VI-A form a chelate ring and R a single organic radical bonded through carbon thereof to the metal M.

More specifically, A can be defined as the acid anion remaining upon removal of a hydrogen atom from an acid, either organic or inorganic; Ch as the diradical of an organic chelate-forming compound containing two or more electron donor groups which are bonded to the central metal atom M of group VI-A in a cyclic structure, i.e., a chelate ring; and R as a cyclic organic radical directly bonded through carbon thereof to the metal M of group VI-A which radical R corresponds to an anion having a resonance stabilization energy of at least 20 kcal. when compared to the corresponding neutral molecule, i.e., the hydride RH, i.e., the neutral molecule produced by adding a hydrogen ion, i.e., proton, to the anion.

The preferred compounds of this invention are those in which the anion is the monovalent anion of an inorganic acid, especially the monobasic hydrohalic acids; the metal of group VI-A is of atomic number 24-42, i.e., chromium or molybdenum; the divalent radical of the chelating ligand forms with the group VI-A metal a five or six-membered ring structure and the organic radical bonded, by carbon thereof, to the group VI-A metal is a monovalent carbocyclic radical of five ring carbons containing two nuclear conjugated carbon carbon double bonds and bonded, through nuclear carbon of said radical, to the group VI-A element. In these new compounds, one of the linkages of the chelating ligand to the metal is an essentially covalent linkage which satisfies one formal valence of the metal and the other is an essentially coordinate linkage, neither of which linkages emanates from the chelating ligand directly through carbon thereof.

The formal valence of the group VI-A metal thus remains at three.

These compounds can be readily and easily prepared by the direct condensation between a simple Grignard compound of the well recognized type RMgX, wherein R is as defined above and X is a halogen, especially chlorine, bromine and iodine, with a simple chelate of the metal element of group VI-A involved. These simple chelates will generally have the structure $M(Ch)_3$ wherein M and Ch are as defined previously. The reaction is generally carried out, as is conventional for Grignard reactions, under anhydrous conditions within the temperature range $-25$ to $+125°$ C. and preferably between the range 0 to 75° C. in an inert liquid anhydrous reaction medium, such as the aromatic hydrocarbons, e.g., benzene, the hydrocarbon ethers, e.g., diethyl ether, and the like. The new organometallic group VI-A metal halide chelates thereby formed can be isolated from the reaction mixture by conventional procedures, such as crystallization, removal of solvent, or by sublimation. These chelate halides can be converted by conventional exchanges to the other salts, e.g., with salts, acids, and esters containing the desired anion radical.

The following example in which all parts are by weight is submitted to illustrate the invention further and not to limit it.

Example I

A solution of 66 parts of ethyl bromide in 66 parts of anhydrous benzene was added slowly with stirring to a mixture of 14.4 parts (an equimolar proportion based on the bromide) of magnesium turnings in about 106 parts of anhydrous diethyl ether. A solution of 39.6 parts (an equimolar proportion based on the bromide) of freshly distilled cyclopentadiene in 39 parts of anhydrous benzene was then added with stirring and the resultant reaction mixture was heated at 50–60° C. for 15 minutes to liberate ethane and form a benzene/ether solution of cyclopentadienyl-magnesium bromide. This solution was added, under anhydrous conditions in an atmosphere of dry nitrogen, dropwise with stirring over a period of 15 minutes to a solution of 70 parts (0.33 molar proportion based on the Grignard reagent) of chromium (III) acetylacetonate in about 440 parts of anhydrous benzene. During the addition, an exothermic reaction occurred and the temperature of the reaction mixture was maintained at 20–25° C. by cooling with an ice-water bath. As the cyclopentadienylmagnesium bromide solution was added, a precipitate formed and the color of the reaction mixture gradually changed from dark-red to dark-brown, and finally to light-brown. The reaction mixture was stirred for an additional hour and then allowed to stand at room temperature under anhydrous conditions for five days.

The precipitate was isolated from the reaction mixture by pressure filtration with nitrogen under anhydrous conditions, and the solid thereby isolated was washed three times with anhydrous benzene. The washed solid was partially dried in a stream of anhydrous nitrogen and finally dried to constant weight in a vacuum desiccator over anhydrous calcium chloride. There was thus obtained about 140 parts of a dull grayish-green solid. This was extracted with anhydrous diethyl ether in a Soxhlet apparatus for a total of 21 hours, after which time the fresh ether extracts were colorless. The diethyl ether solvent was removed from the extract by evaporation under dry nitrogen, and the resultant dark solid residue was sublimed under anhydrous conditions at 165–170° C. under a pressure corresponding to one mm. of mercury until no more sublimate condensed. There was thus obtained 2.8 parts of crude cyclopentadienylchromium (III) acetylacetonate bromide.

The solid was then mixed with about 200 parts of anhydrous n-hexane and the mixture heated to boiling, under anhydrous conditions. Anhydrous benzene was then added in about nine-part portions until approximately 90 parts had been added, at which point most of the solid material had gone into solution. The resultant hot mixture was pressure filtered with nitrogen under anhydrous conditions and the solid thereby isolated was washed twice under anhydrous conditions with a 3/1 by volume anhydrous n-hexane/benzene mixture. The initial filtrate and combined washings were cooled to room temperature and finally chilled in an ice-water bath. The greenish-black crystal plates thus obtained were removed by filtration under anhydrous conditions and combind with more of the same material obtained by recrystallizing from the mother liquor the solid material that had not dissolved initially. After drying under reduced pressure, there was thus obtained a total yield of 1.55 parts (3% of theory), based on the chromium (III) acetylacetonate, of pure cyclopentadienylchromium (III) acetylacetonate bromide as greenish-black plates, melting with decomposition at about 190° C. when dropped on a preheated block.

*Analysis.*—Calculated for $C_{10}H_{12}BrCrO_2$: C, 40.56%; H, 4.09%; Br, 26.99%; Cr, 17.57%; M.W., 296. Found: C, 41.05%; H, 4.14%; Br, 27.34%; Cr, 17.44%; M.W., 292 (ebulliscopic in benzene).

The above example is merely illustrative and not limitative, and the invention is generic to new organometallic compounds in which a group VI-A metal is directly singly bonded to nuclear or ring carbon of a cyclic organic radical with the remaining formal, i.e., absolute, valences of the group VI-A metal being satisfied in a single bond to an acid anion and in forming with an organic ligand a chelate ring. Although the cyclopentadienyl compounds are particularly suited for reasons of availability and reactivity of intermediates, this invention is by no means so limited. Other such compounds are likewise included wherein the cyclic organic radical is monovalent and preferably carbocyclic derived from other cyclic organic compounds which have at least one carbon-carbon ring double bond. A generic relationship exists between all the operable radicals for use in forming the new compounds in this invention and this relationship has been found to be based on the energy relationship for the various organic radicals.

Resonance energy is a well known concept and numerical values therefor can be calculated by known methods. These have a direct correlation with the physical and chemical properties of those compounds in the molecular structure of which resonance occurs. Resonance energy is determined as the difference between the observed energy content, as based on the heat of combustion or hydrogenation, for instance, and that calculated for the molecule from standard values of each possible contributing structure. This is further explained at page 280 et seq., Branch and Calvin, "The Theory of Organic Chemistry," Prentice-Hall, New York, 1941, and by Wheland, "The Theory of Resonance," Wiley, New York, 1944.

High values for resonance energies generally correspond to the relative stability of the compound under consideration. Resonance stabilization is also of practical significance in determining the course of a reaction. For example, calculations show there is a gain of about 25 kcal. in resonance energy in going from cyclopentadiene to the cyclopentadience anion. In going from cyclopentadiene to the monoradical, i.e., the cyclopentadienyl radical, there is a gain of only about 17 kcal. From this it is concluded that the anion of cyclopentadiene is favored as the reactive intermediate in such reactions as the preparation of dicyclopentadienyliron from a cyclopentadienylmagnesium halide and a ferric halide.

The resonance energy difference between a cyclic compound containing at least one double bond and its corresponding anion is based on simple calculations. Roberts et al, J. Am. Chem. Soc. 74, 4579 (1952) employ molecular orbital calculations to obtain the delocalization energies (DE of table on page 4581) which when multiplied by the resonance integral ($\beta$, 17 kcal.) gives the calculated resonance energies. Thus, for cyclopentadiene anion this value is 42 kcal., i.e., 2.47×17. The value of the resonance energy calculated for cyclopentadiene itself is about 16.7 kcal. The difference is 25.3 kcal. In general, it is preferred to calculate the difference in delocalization energy, i.e., ΔDE, and thereby directly obtain calculated resonance energy change in anion formation. For cyclopentadiene this is 1.490β or 25.3 kcal.

The values for the gain in resonance energy in going from various unsaturated cyclic compounds to the corresponding anion can be determined in the fashion mentioned. A further example is 1,3-diphenylcyclopentadiene which has a value for ΔDE of 1.871β=31.8 kcal. For 1,3-dimethylcyclopentadiene and cyclopentadienes having nuclear or side chain sulfonic acid, carboxylic acid, carboxylic acid ester, cyano, carboxamido, substituted carboxamido, carbonyl, ether and similar groups, the resonance energy change is substantially the same as in the case of cyclopentadiene itself. The same is true for the polycyclic types, e.g., indene, 3-phenylindene, 1,3-dimethylindene, 6-methoxy-2-phenyl-3-methylindene, and the like.

The present invention is therefore generic to group VI-A metal organometallic compounds wherein the group VI-A metal is directly bonded to but one such monovalent radical which contains at least one double bond in at least one ring structure, i.e., those which in radical form correspond to an anion having a resonance stabilization energy of at least 20 kcal. and preferably more than 25 kcal. as compared to the simplest corresponding neutral molecule, i.e., the neutral molecule produced by adding a hydrogen ion to the anion. The monovalent radical can be unsubstituted or contain substituents on the ring, e.g., ketonic substituents such as the acetyl group; carboxyl group and esters thereof; cyano groups; carboxamide group; hydroxyl groups; hydrocarbon groups such as aryl and alkyl groups; halogenated hydrocarbon groups and halogen radicals. It is generally preferred that the cyclic radical have substituents on no more than four of the nuclear carbons, although from a theoretical viewpoint, the number of substituents on the nuclear atoms can be as high as the number of such nuclear carbons. Particularly preferred are the cyclic hydrocarbon radicals containing at least one double bond in at least one cyclic structure, including those having alkyl or aryl, aralkyl, alkaryl or cycloalkyl groups on nuclear carbon. Of these, the most outstanding are those having at least one five-membered carbocyclic ring containing two carbon carbond double bonds in said carbocyclic ring.

In the compounds of this invention the group VI-A metal forms, with a chelating agent, a chelate ring. Chelates form an important specialized field of chemistry which has developed widely in recent years. The general chemistry of these compounds, structural significance, properties, and modes of preparation have been summarized by several authors—see, for instance, Diehl, Chem. Rev. 21, 39–111 (1937); Gilman, "Organic Chemistry, an Advanced Treatise," Wiley, 2nd ed., 1943, pp. 1868–1883; and Martell and Calvin, "Chemistry of the Metal Chelate Compounds," Prentice-Hall, New York, 1952. This latter publication, the most recent and most extensive review of the chelate compounds, shows the distinguishing differences between chelate linkages and organometallic linkages wherein a metal is directly bonded to carbon. In chelate compounds a metallic element (here an element of group VI-A) is linked in a ring structure, normally of five to six ring members, with a chelating, i.e., chelate-forming compound which contains at least two electron donor groups so located with respect to one another that they are capable of forming the chelate ring with the central inorganic element.

Organic compounds containing chelating groups are called ligands in the language of chelate chemistry. The donor groups are well known and recognized in this field with a convenient listing occurring in the Diehl article, loc. cit., p. 43, and in the Martell and Calvin book, loc. cit., p. 168. Broadly speaking, these electron donor groups necessary for chelate ring formation are those of the strongly non-metallic elements of groups V–B and VI–B, especially those of atomic numbers 7–16, and particularly nitrogen, oxygen, and sulfur, with oxygen being the most common. In the chelate structure of the precent compounds, the element of group VI–A is twice bonded to the ligand in diradical form through the strongly non-metallic elements of groups V–B and VI–B in the necessary two or more, preferably two, donor groups present in the original ligand.

The organic ligand forming, with the metal of group VI–A, the chelate ring is not bonded to the metal atom through carbon but through strongly non-metallic elements of groups V–B and VI–B. The most usual chelate rings have from five to six ring members and are the most stable. The organic compounds forming the, preferably, divalent ligand needed for chelate formation have, as indicated previously, two electron donor groups wherein the donor atom in the said groups usually is introgen, oxygen or sulfur, especially oxygen. Since the five and six-membered chelate rings are the most stable, the preferred organic ligands have the two oxygen, nitrogen, or sulfur, and especially oxygen, donor atoms separated by two or three other atoms, usually carbon. It is noted that the donor atoms and the central element of group VI–A thus account for three members of the ring structure of the final chelate ring.

Chelating agents wherein the electron donor atom is one of the class, oxygen, nitrogen, or sulfur include chelating agents containing keto, thioketo, thioether, hydroxyl, thioalcohol, carboxyl, imino, or oxime groups with the two necessary donor atoms being alike or different. Because of their readier availability and generally high chelating tendencies, the most preferred donor groups in the chelating ligand are those wherein the donor atom is oxygen and will usually be carbonyl or hydroxyl, including enolized carbonyl. Because of the previously mentioned preference and the greater stability of five or six ring members in the chelate structure, the most preferred chelating ligand contains two oxygen-based donor groups as described above, either directly linked or joined together through one or more additional carbons. In the case of the dicarbonyl type ligands, these compounds are adequately described by the structural formula

$$RCO(CH_2)_nCOR$$

wherein $n$ is a cardinal numeral no greater than one and R is a hydrocarbon, hydroxy, or hydrocarbon ether, e.g., alkoxy. Compounds having both carbonyl and hydroxy groups may be employed.

In the case of the dicarbonyl-containing chelating ligands the carbonyl groups are found in ketone, aldehyde, carboxyl and carboxy ester linkages and in the hydroxy type chelating ligand, the hydroxy is found as such or as the enolized form of the carbonyl group. The most outstanding of these chelating carbonyl type ligands are the enolizable 1,3-dicarbonyl compounds wherein the carbon joining the two carbonyl groups carries at least one hydrogen. Suitable specific examples of these various type chelating ligands, i.e., chelating agents, well known in the art are: acyl ketones, i.e., diketones, especially the β- or 1,3-diketones, e.g., benzoylacetone; acyl acids or ketoacids and esters thereof, especially the β-keto types, e.g., ethyl acetoacetate; the mono- and dioximes of o-quinones and 1,2-diketones, e.g., dimethylglyoxime; the 8-hydroxyquinolines; the o-hydroxyarylenealdehydes and ketones, e.g., salicylaldehyde; and the like.

In the new compounds of the present inventiton a single atom of a group VI–A metal, e.g., chromium or molybdenum, has one formal valence satisfied by direct linkage to carbon of a cyclic organic radical containing at least one nuclear carbon to carbon double bond, said radical corresponding to an anion having a resonance stabilization energy of at least 20 kcal., and generally more than 25 kcal., when compared to the corresponding neutral molecule, i.e., the neutral molecule produced by adding a proton to the anion; a second formal valence satisfied by the anion of an acid, i.e., the negative portion remaining after the removal of a single acidic hydrogen from an acid, either organic or inorganic; and the last formal valence of thte metal satisfied by an essentially covalent link to a strongly non-metallic element of groups V–B and VI–B, which latter element is in turn linked through carbon and other such strongly non-metallic element in an essentially coordinate linkage to the central metal atom of group VI–A forming therewith a chelate ring.

The new compounds of the present invention are represented by the structural formula

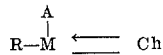

wherein M is a group VI–A element of atomic number 24–42, i.e., chromium or molybdenum; A is an acid anion; Ch is a chelating ligand forming with M a chelate ring; and R is a cyclic organic radical containing at least one nuclear carbon to carbon double bond, and having a resonance stabilization energy of at least 20 kcal. and usually greater than 25 kcal. for the anion corresponding to the radical when compared to the neutral molecule. The radical R is bonded through nuclear carbon thereof to the metal M and the chelating ligand Ch is bonded once covalently and once coordinately (indicated by the arrow bond) through a strongly non-metallic element of groups V–B or VI–B, usually of atomic number from 7 to 16.

In the preferred new compounds of this invention the formal valence of the metal M is three and the compounds are neutral in their over-all molecular structure. One of the formal valences of the metal M is satisfied by the linkage to the radical R in the foregoing formula, one is satisfied by the linkage to the acid anion A, and the third by one of the chelate ring-forming bonds—the remaining chelate ring-forming bond being coordinate or semi-polar as indicated by the arrow bond. These two ring-forming bonds are capable of resonance and are believed to contribute notably thereby to the stability of these new compounds. The compounds of the present invention contain a chelate structure of Type B of Sidgwick. See Johnson in Gilman, "Organic Chemistry" (Wiley, New York, 1943), p. 1873 et seq.; Sidgwick, "The Electronic Theory of Valency" (Oxford, 1927), p. 240, etc.

The preferred compounds of the present invention have the structural formula

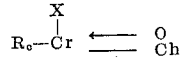

wherein Cr is a chromium atom, X is a monovalent acid anion of a simple mono-, di-, or tribasic inorganic acid, especially of a hydrohalic acid wherein the halogen is of atomic number from 17 through 53, i.e., chlorine, bromine, and iodine; and ChO is a chelate-forming ligand containing two oxygen-based electron donor groups, especially a 1,3-dicarbonyl compound capable of enolization, and forming with the chromium a six-membered chelate ring; and $R_c$ represents a carboxylic radical bonded to Cr through nuclear carbon thereof directly and containing at least one carbocyclic ring of five ring carbons with two nuclear conjugated carbon to carbon double bonds.

While the preferred compounds are carboxylic in nature, it is immaterial whether tthe nuclear carbons of these preferred $R_c$ radicals are substituted or not since substituents on this carboxylic radical have little if any effect on the aromaticity of the new chelate salts. There can be present on the nuclear carbons of the said carbocyclic radicals such substituents as ketones, e.g., acetyl, carboxylic acids and esters thereof, cyano, carboxamido, hydroxy, amino, carboxaldehyde, and the like, as well as substituents, such as hydrocarbon radicals usually free of aliphatic unsaturation and generally of less than seven carbons each, including specifically alkyl, aryl, alkaryl, and cycloalkyl radicals, as well as the closely related and quite similar halogen-substituted hydrocarbon radicals, including specifically the haloalkyl and haloaryl radicals. The number of such substituents on the nuclear carbons of the aforesaid carbocyclic radical $R_c$ can be as high as the number of said carbocyclic atoms, i.e., nuclear carbons. Because of their readier availability and generally superior over-all stability, the most preferred compounds of the present invention contain solely hydrocarbon carbocyclic radicals having at least one five-membered carbocyclic nucleus, directly attached through carbon thereof to the chromium.

Suitable specific examples of the compounds of the present invention in addition to those discussed previously include those wherein the cyclic hydrocarbon radical carries hydrocarbon substituents such as aromatic, aliphatic, araliphatic, alkaromatic, and cycloaliphatic substituents, e.g., ethylcyclopentadienylchromium ethyl acetoacetate iodide, cyclohexylcyclopentadienylchromium salicylaldehyde chloride, which may alternatively be termed salicylaldehydocyclohexylcyclopentadienylchromium chloride, phenylindenylchromium ethyl trifluoroacetoacetate iodide, methylcyclopentadienylmolybdenum acetylacetonate bromide, 1,3-diphenylcyclopentadienylchromium benzoylacetonate iodide; those wherein the cyclic organic radical carries additional substituents, e.g., acetylcyclopentadienylchromium acetylacetonate fluoride, formylethylcyclopentadienylchromium dimethylglyoxime bromide; those wherein the anion is of a polybasic inorganic acid, e.g., cyclopentadienylmolybdenum acetylacetonate methylsulfate, cyclopentadienylchromium acetylacetonate phosphate, and the like.

A convenient method for preparing compounds of the present invention and one illustrated above employs an appropriate Grignard reagent wherein magnesium is bonded to a halogen of atomic number of 17 to 53 and to a carbocyclic radical, as above, of at least one nuclear carbon to carbon double bond and of resonance stabilization energy at least 20 kcal. greater than the hydrocarbon which is the hydride of the radical. In this method the above Grignard reagent is reacted, with a simple chelate, usually of the formula $M(CH)_3$ wherein M is a group VI–A metal, e.g., chromium or molybdenum and Ch is a chelate ligand, e.g., those enumerated above.

The Grignard method is particularly suitable for the preparation of the most preferred compounds of this invention wherein the chromium atom is joined to a halide anion of atomic number within the range 17–53, to a chelate ligand of two oxygen donor groups, and to nuclear carbon of a carbocyclic hydrocarbon radical of five nuclear carbons and two nuclear, conjugated, carbon to carbon, double bonds.

The compounds of this invention are useful in catalytic applications, for example, oxidation reactions or in carbonylation reactions, i.e., reactions of organic compounds with carbon monoxide.

The good organic solubility, especially in aromatic systems, of the novel compounds of the present invention makes them a convenient source for the preparation of other members of the class as has been illustrated above and permits the conversion of these important metals into many new and desirable organometallic forms previously unavailable. They are also useful as additives for metal plating baths.

The monovalent acid anion, i.e., the monovalent aprotic radical of an acid, of the organometallic chelates of this invention is slightly, if at all, ionized.

The foregoing detailed description has been given for clearness of understanding only and no unnecessary limi-

What is claimed is:

1. Metal compounds wherein a single tervalent metal atom selected from the group consisting of tervalent chromium and tervalent molybdenum is joined by one formal valence each
    (a) to an acid anion,
    (b) to a chelate ligand, and
    (c) to nuclear carbon of a cyclopentadienyl ring on which any substituent is a hydrocarbon radical of no more than 7 carbon atoms selected from the class consisting of alkyl, cycloalkyl, aryl and aralkyl radicals.
2. Chromium compounds wherein a single atom of chromium (III) is joined by one formal valence each
    (a) to an acid anion,
    (b) to a chelate ligand,
    (c) to a cyclopentadienyl radical.
3. Chromium compounds wherein a single atom of chromium (III) is joined by one formal valence each
    (a) to an acid anion,
    (b) to a 1,3-dicarbonyl chelate ligand,
    (c) to a cyclopentadienyl radical.
4. Chromium compounds wherein a single atom of chromium (III) is joined by one formal valence each
    (a) to a halogenide anion,
    (b) to a 1,3-dicarbonyl chelate ligand,
    (c) to a cyclopentadienyl radical.
5. Chromium compounds wherein a single atom of chromium (III) is joined by one formal valence each
    (a) to a halogenide anion of atomic number within the range 17–53,
    (b) to a chelate ligand of two oxygen donor groups,
    (c) to nuclear carbon of a carbocyclic hydrocarbon radical of five nuclear carbons and two nuclear, conjugated, carbon to carbon, double bonds.
6. Chromium compounds wherein one tervalent chromium atom is joined by one formal valence each to
    (a) a halogenide anion,
    (b) a chelate ligand, forming therewith a chelate ring, and
    (c) a cyclopentadienyl radical.
7. Chromium compounds wherein one tervalent chromium atom is joined by one formal valence each to
    (a) a halogenide anion of atomic number within the range 17–53,
    (b) a chelate ligand derived from an enolizable 1,3-dicarbonyl compound by removal of a hydrogen, forming therewith a six-membered chelate ring, and
    (c) a cyclopentadienyl radical.
8. Cyclopentadienylchromium (III) chelate halogenides.
9. Cyclopentadienylchromium (III) acetylacetonate halogenides.
10. Cyclopentadienylchromium (III) acetylacetonate bromide.

References Cited in the file of this patent

Wilkinson: J. Am. Chem. Soc., vol. 74, page 6146, December 5, 1952. (Rec. June 12, 1952.)

Wilkinson: J. Am. Chem. Soc., vol. 74, December 5, 1952, pages 6148–49. (Rec. June 12, 1952.)

Wilkinson: J. Am. Chem. Soc., vol. 75, February 1953, page 1011. (Rec. January 15, 1953.)

Cotton et al.: J. Am. Chem. Soc., vol. 75, pages 3586–87, June 20, 1953. (Rec. February 5, 1953.)